United States Patent [19]
Zanini-Fisher et al.

[11] Patent Number: 5,231,878
[45] Date of Patent: Aug. 3, 1993

[54] MASS AIR FLOW SENSOR

[75] Inventors: Margherita Zanini-Fisher, Bloomfield Township, Oakland County; Craig H. Stephan, Ann Arbor, both of Mich.

[73] Assignee: Ford Motor Company, Dearborn, Mich.

[21] Appl. No.: 812,397

[22] Filed: Dec. 23, 1991

[51] Int. Cl.$^5$ .................................................. G01F 1/68
[52] U.S. Cl. .................................. 73/204.26; 338/25
[58] Field of Search ........... 73/204.18, 204.19, 204.23, 73/204.25, 204.26, 204.27; 338/25, 225 D

[56] References Cited

U.S. PATENT DOCUMENTS

| | | |
|---|---|---|
| 4,472,239 | 9/1984 | Johnson et al. |
| 4,594,889 | 6/1986 | McCarthy |
| 4,680,963 | 7/1987 | Tabata et al. ............... 73/204.26 |
| 4,771,271 | 9/1988 | Zanini-Fisher |
| 4,808,549 | 2/1989 | Mikkor et al. |
| 4,843,445 | 6/1989 | Stemme |
| 4,870,860 | 10/1989 | Ohta et al. |

FOREIGN PATENT DOCUMENTS 8903512  5/1989  PCT Int'l Appl.

OTHER PUBLICATIONS

Unagami, Takashi, "Oxidation of Porous Silicon and Properties of Its Oxide Film," *Japanese Journal of Applied Physics*, vol. 19, No. 2, Feb. 1980, pp. 231–241.

Imai, Kazuo, "A New Dielectric Isolation Method Using Porous Silicon," *Solid-State Electronics*, vol. 24, (1981) pp. 159–164.

Imai, Kazuo et al., "FIPOS (Full Isolation by Porous Oxidized Silicon Technology and Its Application to LSI's," *IEEE Transactions on Electron Devices*, vol. ED-31, No. 3, Mar. 1984, pp. 297–302.

Smith, R. L. et al., "An Integrated Sensor for Electrochemical Measurements," *IEEE Transactions on Biomedical Engineering*, vol. BME-33, No. 2, Feb. 1986, pp. 83–90.

Tabata, Osamu, "Fast-Response Silicon Flow Sensor with an On-Chip Fluid Temperature Sensing Element," *IEEE Transactions on Electron Devices*, vol. ED-33, No. 3, Mar. 1986, pp. 361–365.

Ford Motor Company Technical Report No. SR 89-160 *Functional Behavior of a Batch-Fabrication Monolithic Silicon Mass Air Flow Sensor*, C. H. Stephan, Jan. 23, 1990.

IEEE Publication No. 0018-9383/86/1000-1470§1.00 "A Monolithic Gas Flow Sensor with Polyimide as Thermal Insulator", Goran N. Stemme, *IEEE Transactions on Electron Devices*, vol. ED-33, No. 10, Oct. 1986.

C. H. Stephan and M. Zanini, *A Micromachined, Silicon Mass-Air-Flow Sensor For Automotive Applications*; (undated).

*Primary Examiner*—Herbert Goldstein
*Attorney, Agent, or Firm*—Allan J. Lippa; Roger L. May

[57] ABSTRACT

A micromachined mass air flow sensor comprises a silicon substrate with an air flow opening formed therethrough. One or more silicon members carrying a thin film resistor extend over the air flow opening. The silicon members are thermally isolated from the silicon substrate frame about the air flow opening by thermal isolation zones of porous silicon oxide.

11 Claims, 2 Drawing Sheets

MASS AIR FLOW SENSOR

FIELD OF THE INVENTION

This invention relates to mass air flow sensors employing a micromachined silicon chip. A method aspect of the invention relates to manufacture, especially batch manufacture, of such sensors.

BACKGROUND OF THE INVENTION

It has long been known to use micromachined silicon mass air flow sensors (MAFS) in applications including, for example, motor vehicle engine air intake sensors. Such sensors operate as a hot film anemometer sensor. Hot film anemometry employs a wire resistor or a thin film resistor deposited on a substrate, such as quartz, glass or silicon. Typically, associated sensor circuitry, usually IC circuitry, maintains the wire or thin film resistor at a certain temperature (or temperature differential) above the temperature of the fluid flow being measured. Any change in the flow correspondingly alters the cooling effect on the heated resistor. The associated sensor circuitry senses such change and generates a corresponding signal.

An important feature of a MAFS based on the hot film anemometry principle is good thermal isolation of the heated element from its supporting structure. In the MAFS device disclosed in U.S. Pat. No. 4,594,889 to McCarthy a monolithic silicon air flow sensor is disclosed wherein a silicon chip is micromachined using commercially known techniques to produce an air flow opening through the chip, the opening being divided by one or more silicon beams unitary with the silicon chip substrate. A thin film resistor is deposited on the silicon beams using commercially known metalization techniques. Relatively good thermal isolation is achieved by making the beam cross-section small compared to its length, for example, 50 micron by 50 micron cross-sectional area for a beam bridging a 5 mm air flow opening. Increasing the cross-sectional area of the silicon beams would increase the durability of the sensor. Smaller beams are more easily damaged by dust and other particulate matter entrained in the air flow being measured.

Larger beam cross-sections, however, while more durable, cause a larger portion of the heat dissipated on the beam to be lost to the silicon substrate. That is, heat flows from the end of the beam into the silicon substrate at the perimeter of the air flow opening. Thus, larger beam sizes would require more power to operate and the zero air flow offset factor is correspondingly large. Thus, larger cross-section beams have a disadvantageously reduced signal-to-noise ratio, making accurate air flow sensing more difficult. In addition, the temperature increase of the substrate resulting from use of a larger, more durable silicon beam can introduce an error in the measurement of the heat transferred to the air flow. Also, temperature compensation of the sensor is made more difficult, because the coefficient of thermal conductivity of silicon decreases with increasing temperature while the silicon-to-air heat transfer coefficient increases.

Thus, there is a need for a mass air flow sensor which has good durability and also good accuracy and reliability. It is an object of the present invention to provide a sensor having both good durability and good accuracy. Additional objects and advantages of various embodiments of the invention will be apparent from the following disclosure and discussion thereof.

SUMMARY OF THE INVENTION

In accordance with the present invention, a mass air flow sensor comprises a generally planar silicon substrate having an air flow opening therethrough. A silicon member extends across the air flow opening from a first thermal isolation zone at the perimeter of the opening, preferably to a second thermal isolation zone. A thin film resistor extends over the air flow opening on a surface of the silicon member and electrical connection means are provided for connecting the resistor to associated sensor circuitry. Significantly, the thermal isolation zones of the invention are formed of porous silicon oxide, which has relatively low thermal conductivity and thus acts to inhibit conduction of heat from the silicon member to the supporting silicon substrate. This is a significant advantage in that a desired level of accuracy can be achieved using a silicon member of relatively large cross-sectional area. Thus, a sensor having good durability together with good accuracy is achieved. The larger silicon members are better able to withstand the impact of dust and other particulates in the air flow being measured. A good signal-to-noise ratio is achieved, less operating power is required than for a corresponding sensor without the porous silicon oxide thermal isolation zones, and correspondingly reduced error is introduced by heat transfer to the air flow from the silicon substrate.

In accordance with a method aspect of the invention, a sensor as described above is fabricated by first providing a generally planar silicon substrate. A protective mask is grown on the silicon substrate, following which reduced density zones are formed in the substrate. That is, the selectively masked silicon substrate is treated, for examply by electrochemical oxidation process in hydrofluoric acid, to reduce the density of the silicon at the unmasked portions to a certain depth. Thermal isolation zones are then formed by oxidizing the reduced density zones to form porous silicon oxide. The modified silicon substrate is then selectively metalized to form thin film resistors between the thermal isolation zones and to form electrical connection means for connecting the thin film resistor to sensor circuitry. The metalized and modified silicon substrate then is selectively etched to form an air flow opening therethrough. The first and second thermal isolation zones with a thin film resistor extending between them are positioned on opposite sides of the air flow opening perimeter. A silicon member extends between the thermal isolation zones carrying the thin film resistor. It will be recognized by those skilled in the art that the method of the present invention can be carried out employing fabrication techniques which are commercially known and widely used in the manufacture of MAFS and integrated circuits. The method of the invention is particularly advantageous in accordance with certain preferred embodiments providing batch fabrication of the sensors. In addition, since the sensor is a micromachined monolithic silicon sensor, proper application of known silicon fabricating techniques can provide good production efficiency with good control and uniformity of sensor dimensions and performance.

Additional features and advantages of the invention will be apparent to those skilled in the art in view of the following detailed description of certain preferred embodiments.

BRIEF DESCRIPTION OF THE DRAWINGS

The detailed description of certain preferred embodiments of the invention provided below refers to the accompanying drawings wherein:

FIG. 4 is a cross-sectional view taken through line 4—4 in FIG. 3 and FIG. 5 is cross-sectional view taken through line 5—5 in FIG. 3.

DETAILED DESCRIPTION OF CERTAIN PREFERRED EMBODIMENTS

Figure 1:
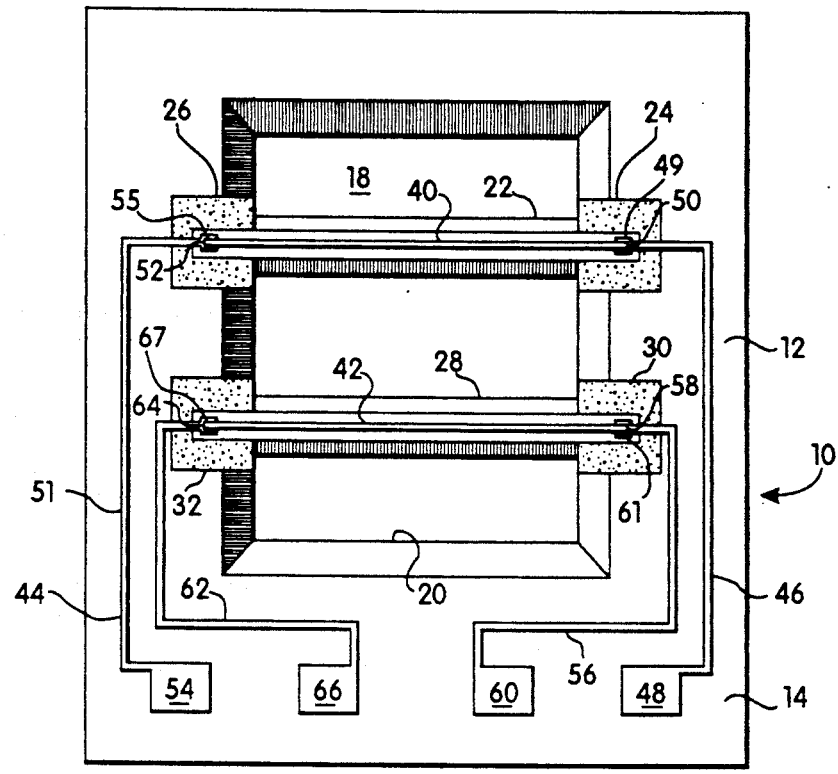
FIG. 1 is a plan view of a mass air flow sensor in accordance with a preferred embodiment of the invention.

It should be understood that all directional terms used in the discussion below and in the claims which follow including, for example, reference to an upper or lower surface of a component, are used for convenience and correspond generally to the orientation illustrated in the drawings. Such terms are not meant to limit the invention to any particular configuration or to use in any particular orientation.

Figure 2:
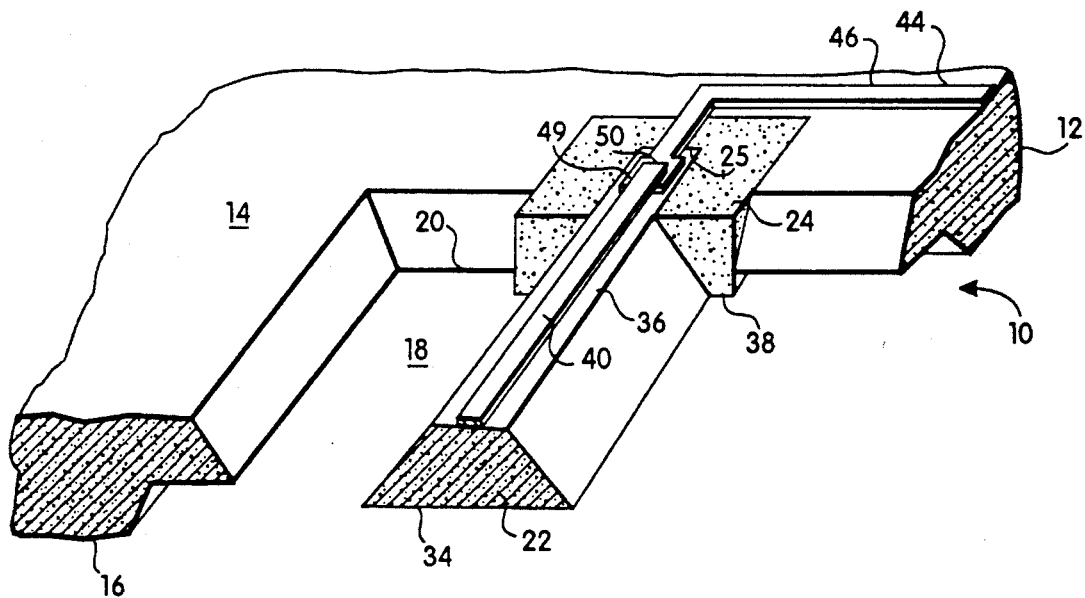
FIG. 2 is an enlarged perspective view, partially broken away, of the upper right thermal isolation zone area of the embodiment of FIG. 1.

Referring now to FIGS. 1 and 2, a micromachined silicon monolithic mass air flow sensor 10 is seen to comprise a generally planar silicon substrate 12 having an upper surface 14 and a lower surface 16. An air flow opening 18 through the silicon substrate 12 is defined by an air flow opening perimeter 20. A first silicon member 22 extends across the air flow opening from a first thermal isolation zone 24 to a second thermal isolation zone 26. The thermal isolation zones 24 and 26 are seen to be opposite one another at the air flow opening perimeter 20. A second silicon member 28 (shown in FIG. 1) is substantially identical to first silicon member 22. It extends across the air flow opening substantially parallel to first silicon member 22 from a third thermal isolation zone 30 to a fourth thermal isolation zone 32. Again, both the third and the fourth thermal isolation zones are located at the air flow opening perimeter 20. As described further below, the porous silicon oxide preferably is made to be essentially void free.

It can be seen that the silicon members 22 and 28 are trapezoidal in cross-section. As seen in FIG. 2, the bottom surface 34 of silicon member 22 is wider than top surface 36. The good thermal isolation provided by the thermal isolation zones enables the use of larger cross-sectional area silicon members for improved durability while retaining good accuracy. Thus, for example, good sensor accuracy can be achieved using silicon members which are more than 100 microns wide (width being the dimension of the top and bottom surface of the member perpendicular to the longitudinal axis). According to one preferred embodiment of the invention, the beam is about 200 microns thick, the upper surface is 60 to 200 microns wide, the lower surface is 340 to 480 or more microns wide and the length (that is, the longitudinal dimension) is about 4 to 6 millimeters. Those skilled in the art will appreciate from this disclosure and description of the invention that the silicon member need not in all applications extend across the entire width of the air flow opening. Rather, in some embodiments of the invention the silicon member may be a beam extending from a thermal isolation zone at the perimeter of the air flow opening and having a free opposite end. Also, the silicon member may be square or rectangular in cross-section. Preferably, however, a trapezoidal shape is used, the thin film resistor (described below) being deposited on either the more narrow or wider surface and either facing the oncoming air flow or being on the leeward surface.

In the preferred embodiment of the invention illustrated in FIGS. 1 and 2, the silicon members, the thermal isolation zones and the silicon substrate all have a co-planar upper surface. By means of a double sided etch (further described below) in accordance with well known silicon fabrication and micromachining techniques, and by control of the depth to which the porous silicon oxide thermal isolation zone is formed, the lower surface 38 of the thermal isolation zone is recessed from the lower surface 16 of the silicon substrate 12. The silicon beams 22 and 28 are recessed even further, such that the silicon beams have less thickness (that is, vertical dimension) than the original silicon substrate. Significantly, the silicon beams are entirely discontiguous from the silicon substrate. The silicon beams are integral with the thermal isolation zones which, in turn, are integral with the silicon substrate. While the silicon beams could have a single plane interface with the thermal isolation zone at each end, it is preferred that the silicon members be received into a recess in the thermal isolation zones, as in the embodiment illustrated in FIGS. 1 and 2, for improved strength and durability. Referring to FIG. 2, the thermal isolation zone 24 is seen to have a U-shaped configuration forming a recess 25. In FIG. 1 it is seen that the recess of each thermal isolation zone is open to the air flow opening and, more specifically, is open to, and aligned opposite, the recess of the opposite thermal isolation zone.

A resistive thin film 40 is formed on upper surface 36 of silicon member 22. Similarly, a resistive thin film 42 is formed on the upper surface of silicon member 28. The resistive thin film may be formed of any suitable material, a number of which are known to those skilled in the art of IC fabrication and MAFS fabrication. Nickel and platinum are preferred in view of their resistor properties and the ease with which they are deposited by well known metalization techniques. The resistors preferably terminate at the end of the silicon members or in certain applications on the upper surface of the thermal isolation zone. Electrical connection means 44 is provided for connecting the ends of the thin film resistors to circuitry connection sites for associated sensor circuitry. Such circuitry may be formed in or carried on the silicon substrate. It is not necessary, however, that the associated sensor circuitry be carried on-board the silicon substrate; it may be remote therefrom with electrical connection to the aforesaid electrical connection means 44.

In the preferred embodiment illustrated in FIGS. 1 and 2, electrical connection means 44 is seen to comprise a set of thin film leads, including specifically first electrical lead 46 extending on the upper surface 14 of the silicon substrate 12 from a wire bond pad 48 to electrical connection pad 49 making electrical connection with terminus 50 of thin film resistor 40. Wire bond pad 48 is remote from the air flow opening 18. A second electrical lead 51 is seen to extend on the surface 14 of silicon substrate 12 from electrical connection pad 55 making electrical connection with the second terminus 52 of thin film resistor 40, to a wire bond pad 54 remote from the air flow opening 18. A third electrical lead 56 extends on the surface of the silicon substrate from electrical connection pad 61 making electrical connection with the first terminus 58 of the second thin film resistor 42 on the second silicon member 28 to a wire bond pad 60 remote from the air flow opening. A fourth electrical lead 62 extends from electrical connection pad 67 making electrical connection with the second terminus 64 of thin film resistor 42, to a wire bond pad 66 remote from the air flow opening. The electrical leads 46, 50, 56 and 62, including their associated electrical connections and wire bond pads preferably are formed by any of the well known metalization techniques currently in commercial use for the production of mass air flow sensors, integrated circuits and the like. Preferably the leads are either gold, preferably over a chromium adhesion layer, or aluminum. Alternative metals will be apparent to those skilled in the art in view of the present disclosure for particular applications in which the sensor is to be used.

The U-shaped configuration shown in the drawings for the thermal isolation zones is advantageous for several reasons. The thermal isolation zones can be kept relatively small, preferably about 1 to 2 millimeters in width, to minimize stresses and for overall strength of the sensor component and its bowing characteristics. Further, it provides a high contact area between the silicon member and the porous silicon oxide material for good strength. It is generally preferable to use porous silicon oxide in thermal isolation zones embedded in a silicon substrate frame, as in the embodiment of FIGS. 1 and 2, rather than simply silicon beams attached to a porous silicon oxide frame, both for thermal uniformity along the frame and for strength.

In accordance with the method aspect of the invention, micromachined sensors in accordance with the invention are fabricated by first providing a generally planar silicon substrate. Preferably, the method is carried out as a batch fabrication method wherein a plurality of micromachined sensor components are produced from a single silicon substrate wafer. Suitable silicon substrate wafers include commercially available wafers about 400 to 600 microns thick. For purposes of this discussion, a batch fabrication method will be described. It will be readily apparent to those skilled in the art from the present disclosure that the method steps are equally applicable for the fabrication of a single sensor component.

Individual fabrication steps described below employ techniques and materials well known to those skilled in the art of IC manufacture, monolithic silicon mass air flow sensor manufacture, etc. The preparation of porous silicon and its derivative, porous silicon oxide, for example, is well known to those skilled in the art. Porous silicon oxide has been used, for example, for dielectric isolation in high temperature integrated circuits, as described in K. Imai, Solid State Electronics, 24, 159 (1981); K. Imai et al, IEEE Trans. Elec. Dev., ED-31, 297 (1984); and S. S. Tsao, IEEE Circuits and Devices Ma., November 1987, pg. 3, and references cited therein. Oxidation of porous silicon is described, for example, in T. Unagami, Jap. J. Appl. Phys., 19, 231 (1980). The fabrication of silicon sensors also is described, for example, in U.S. Pat. No. 4,771,271 to Zanini-Fisher. The disclosure of U.S. Pat. No. 4,771,271 and that of the above identified publications are incorporated herein by reference.

A protective mask is provided on the silicon substrate wafer. Preferably the protective mask is a silicon nitride coating grown on the lower surface and selectively on the upper surface of the wafer. Protective masks and coatings, and their formation are well known to those skilled in the art of sensor manufacture and IC manufacture. Optionally, a layer of silicon oxide may be provided under the silicon nitride protective mask. The upper surface of the wafer is selectively protected, leaving unprotected a plurality of thermal isolation zone sites, preferably U-shaped surface areas, beneath which the thermal isolation zones will be formed as now described.

Following the selective masking of the silicon substrate wafer, a plurality of reduced density zones are formed, such zones being located in pairs, each with its recess opened to, and aligned across from, the other zone in its pair. It will be understood from this discussion that the location, orientation and spacing of the unprotected surface areas (i.e., the thermal isolation zone sites) (and correspondingly the reduced density zones) determine these configuration aspects in the final sensor product. The density of the silicon is reduced, preferably, by electrochemical oxidation in hydrofluoric acid. It is within the ability of those skilled in the art to select current density and process duration to yield a desired silicon density and a desired depth for the reduced density zones. Preferably, the silicon is reduced in density to about 0.4 that of the original silicon substrate wafer. Electrical contact to the silicon can be made, for example, by a platinum metalization deposited on a small area of bare silicon on the wafer. The reduced density zone preferably is formed to a depth equal to, or greater than, the intended depth of the silicon member such that the silicon member can be entirely discontiguous from the remainder of the silicon substrate.

The reduced density zones are then oxidized. Preferably they are exposed to an oxidizing atmosphere at elevated temperature to convert the porous silicon to porous silicon oxide. The thermal conductivity of porous silicon oxide is small compared to that of the original silicon substrate. The oxidation process also acts as a densification process, since the silicon in the reduced density zone expands in volume as it is transformed to silicon oxide. The resulting thermal isolation zones are, therefore, relatively strong. Also, the structure is preferably relatively stress free. This can be achieved by controlling the oxidation process to yield porous silicon oxide which is substantially void free. The resulting thermal isolation zones, in accordance with preferred embodiments of the invention, are smooth on the surface; continuous metal films can be deposited thereon.

After preparation of the porous silicon oxide thermal isolation zones, the wafer is further processed to form the final sensor component structure. Such further processing steps preferably follow essentially the method described in U.S. Pat. No. 4,594,889 to McCarthy, the disclosure of which is incorporated herein by reference. Such steps are well known in the field of silicon sensor fabrication and IC manufacture. The upper surface of the silicon substrate wafer is selectively metalized to form a plurality of thin film resistors. As described above, such resistors preferably are formed of platinum or nickel, each extending on the upper surface of the wafer between a pair of thermal isolation zones. The resistors preferably are fabricated by sputter deposition, photo lithography and chemical etch or by electron beam deposition, photo lithography and wet etch. The resistor width preferably is kept smaller than that of the recess in the thermal isolation zone to ensure that, after etching the silicon, each resistor rests fully on its silicon beam support. Electrical connection means are formed on the upper surface of the wafer, preferably comprising either gold over a chromium adhesion layer or aluminum. Here again, the metalization step for forming such electrical connection means follows techniques well known to those skilled in the art. Preferably, the metal layers then are passivated to protect them during subsequent processing steps. Passivation can be by silicon nitride, for example, plasma enhanced chemical vapor deposited silicon nitride. The passivation on the silicon wafers is subsequently selectively stripped, for example, by lithography and plasma etching, to allow formation of the air flow openings and silicon members, preferably by double-sided etching, preferably anisotropic etching by EDP or the like. Advantageously, the porous silicon oxide is substantially unaffected by anisotropic EDP silicon etch. Etching from both sides produces silicon members whose thickness is approximately half that of the original silicon wafer. Those skilled in the art will recognize that beams of different thicknesses can be obtained by a timed etch, passivation of one surface (for instance, the bottom surface for beams thicker than half the wafer thickness), and/or continuation of the etch after breakthrough as described in U.S. Pat. No. 4,771,271 to Zanini-Fisher, the disclosure of which is incorporated herein by reference. The resulting structure has silicon members extending across an air flow opening, wherein the silicon members are attached at both ends to porous silicon oxide thermal isolation zones.

Figure 3:
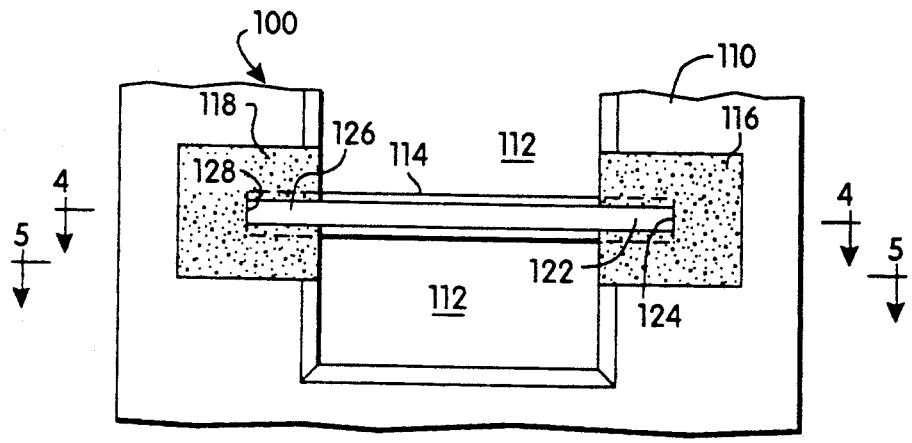
FIGS. 3, 4 and 5 illustrate the fabrication of a mass air flow sensor in accordance with a preferred method of this invention. Specifically.
Figure 4:
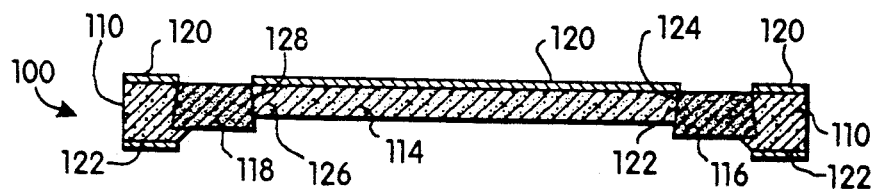
Figure 5:

Referring now to FIGS. 3-5, a sensor 100, shown partially broken away, is seen to comprise a silicon substrate 110 having an air flow opening 112 formed therethrough. Silicon member 114 bridges across the air flow opening 112 from a first thermal isolation zone 116 on the right side of the air flow opening 112 to a second thermal isolation zone 118 on the opposite side of the air flow opening 112. The two thermal isolation zones 116, 118 are formed of porous silicon oxide in accordance with the present invention, as described above. The silicon substrate 110 and the silicon member 114 are formed of silicon, both integral with the thermal isolation zone, but discontiguous from each other. A silicon nitride protective coating 120 selectively covers the upper surface, and a silicon nitride protective coating 122 selectively covers the lower surface. For purposes of simplicity of illustration, a metal resistor film and electrical connection means are not shown in the drawings. Taking FIGS. 3-5 together, it can be seen that the silicon member 114 has a first end portion 122 received in a recess 124 formed by the U-shaped thermal isolation zone 116. Similarly, opposite end portion 126 of silicon member 114 is received in recess 128 of thermal isolation zone 118.

In the preferred batch manufacturing process, the etched assembly is subsequently divided into individual sensor components.

The various preferred versions or embodiments of the invention described in detail above are intended only to illustrate the invention. Those skilled in the art will recognize that modifications, additions and substitutions can be made in various features and elements without departing from the true scope and spirit of the invention. The following claims are intended to cover the true scope and spirit of the invention.

We claim:

1. A mass air flow sensor comprising a generally planar silicon substrate having an upper surface, a lower surface, an air flow opening therethrough defined by an air flow opening perimeter, a silicon member extending in the air flow opening from a thermal isolation zone comprising porous silicon oxide at the air flow opening perimeter, a thin film resistor on a surface of the silicon member, extending from a first end to a second end and electrical connection means for connecting the first end and the second end to sensor circuitry.

2. A mass air flow sensor comprising a generally planar silicon substrate having an upper surface, a lower surface, an air flow opening therethrough defined by an air flow opening perimeter, a first silicon member extending across the air flow opening from a first thermal isolation zone at the air flow opening perimeter to a second thermal isolation zone at the air flow opening perimeter opposite the first thermal isolation zone, a first thin film resistor on a surface of the first silicon member, extending from a first end to a second end across the air flow opening, and electrical connection means for connecting the first end and the second end to sensor circuitry, wherein the first and second thermal isolation zones comprise porous silicon oxide.

3. The air flow sensor in accordance with claim 2 further comprising a second silicon member, substantially identical to the first silicon member, extending across the air flow opening, substantially parallel to and spaced from the first silicon member, from a third thermal isolation zone at the air flow opening perimeter to a fourth thermal isolation zone at the air flow opening perimeter opposite the third thermal isolation zone, and a second thin film resistor, substantially identical to the first thin film resistor, on a surface of the second silicon member, extending from a third end to a fourth end of the silicon member across the air flow opening. The electrical connection means being further for connecting the third end and the fourth end to sensor circuitry, wherein the third and the fourth thermal isolation zones comprise porous silicon oxide.

4. The mass air flow sensor of claim 3 wherein the first thin film resistor and the second thin film resistor each consists essentially of metal selected from nickel and platinum.

5. The mass air flow sensor of claim 4 wherein the electrical connection means comprises a metalization pattern on the upper surface of the silicon substrate comprising:
   a first thin film lead extending from electrical connection with the first end of the first thin film resistor to a first circuitry connection site;
   a second thin film lead extending from electrical connection with the second end of the first thin film resistor to a second circuitry connection site;
   a third thin film lead extending from electrical connection with the third end of the second thin film resistor to a third circuitry connection site; and
   a fourth thin film lead extending from electrical connection with the fourth end of the second thin film resistor to a fourth circuitry connection site.

6. The mass air flow sensor in accordance with claim 5 wherein the first, second, third and fourth thin film leads each consists essentially of metalization selected from gold over a chromium adhesion layer and aluminum.

7. The mass air flow sensor in accordance with claim 2 wherein the thermal isolation zones have a depth less than the thickness of the silicon substrate and the silicon member has a depth less than the depth of the thermal isolation zones.

8. The mass air flow sensor in accordance with claim 2 wherein the thermal isolation zones have a U-shaped configuration forming a recess and the first silicon member is a beam of silicon having a first end portion extending into the recess in the first thermal isolation zone and a second end portion, opposite the first end portion, extending into the recess in the second thermal isolation zone.

9. The mass air flow sensor in accordance with claim 2 wherein the thermal isolation zones and the silicon substrate have substantially equal density.

10. The mass air flow sensor in accordance with claim 2 wherein the silicon member is 4 to 6 mm long and has a trapezoidal cross-section with an upper surface more narrow than its lower surface, the upper surface being from 60 to 200 microns wide and the lower surface being 340 to 480 microns wide.

11. A mass air flow sensor comprising:
   a generally planar silicon substrate having an upper surface, a lower surface and an air flow opening therethrough defined by an air flow opening perimeter;
   a first thermal isolation zone of porous silicon oxide in the silicon substrate at the air flow opening perimeter, having a U-shaped configuration forming a recess open to the air flow opening, and a second thermal isolation zone of porous silicon oxide in the silicon substrate at the air flow opening perimeter opposite the first thermal isolation zone, having a U-shaped configuration forming a recess open to the air flow opening;
   a third thermal isolation zone of porous silicon oxide in the silicon substrate at the air flow opening perimeter having a U-shaped configuration forming a recess open to the air flow opening, and a fourth thermal isolation zone of porous silicon oxide in the silicon substrate at the air flow opening perimeter opposite the third thermal isolation zone, having a U-shaped configuration forming a recess open to the air flow opening, the first, second, third and fourth thermal isolation zones having density substantially equal to that of the silicon substrate;
   a first elongate silicon beam extending across the air flow opening from the first thermal isolation zone to the second thermal isolation zone, having (i) an upper surface substantially co-planar with the upper surface of the silicon substrate, (ii) a first end portion in the recess of the first thermal isolation zone, and (iii) a second end portion, opposite the first end portion, in the recess of the second thermal isolation zone;
   a second elongate silicon beam substantially identical to the first elongate silicon beam, extending across the air flow opening laterally spaced from, and substantially parallel to, the first elongate silicon beam, extending from the third thermal isolation zone to the fourth thermal isolation zone, having (i) an upper surface substantially co-planar with the upper surface of the silicon substrate, (ii) a third end portion in the recess of the third thermal isolation zone, and (iii) a fourth end portion in the recess of the fourth thermal isolation zone;
   a first metal thin film resistor selected from nickel and platinum, extending from a first end to a second end across the air flow opening on the upper surface of the first elongate silicon beam;
   a second metal thin film resistor of the same metal as the first metal thin film resistor, extending from a third end to a fourth end across the air flow opening on the upper surface of the second elongate silicon beam; and
   electrical connection means for connecting the first end and the second end of the first metal thin film resistor and the third end and the fourth end of the second metal thin film resistor to sensor circuitry.

* * * * *